NESTING AND STACKING TRAY

Original Filed Nov. 12, 1967 4 Sheets-Sheet 1

INVENTOR.
ALVIN W. LEVENHAGEN
BY
Charles L. Lovercheck
attorney

NESTING AND STACKING TRAY

Original Filed Nov. 12, 1967 4 Sheets-Sheet 2

INVENTOR.
ALVIN W. LEVENHAGEN
BY
Charles L. Longreheck
attorney

NESTING AND STACKING TRAY

Original Filed Nov. 12, 1967 4 Sheets-Sheet 3

INVENTOR.
ALVIN W. LEVENHAGEN
BY
Charles L. Lovercheck
attorney

NESTING AND STACKING TRAY
Original Filed Nov. 12, 1967 4 Sheets-Sheet 4
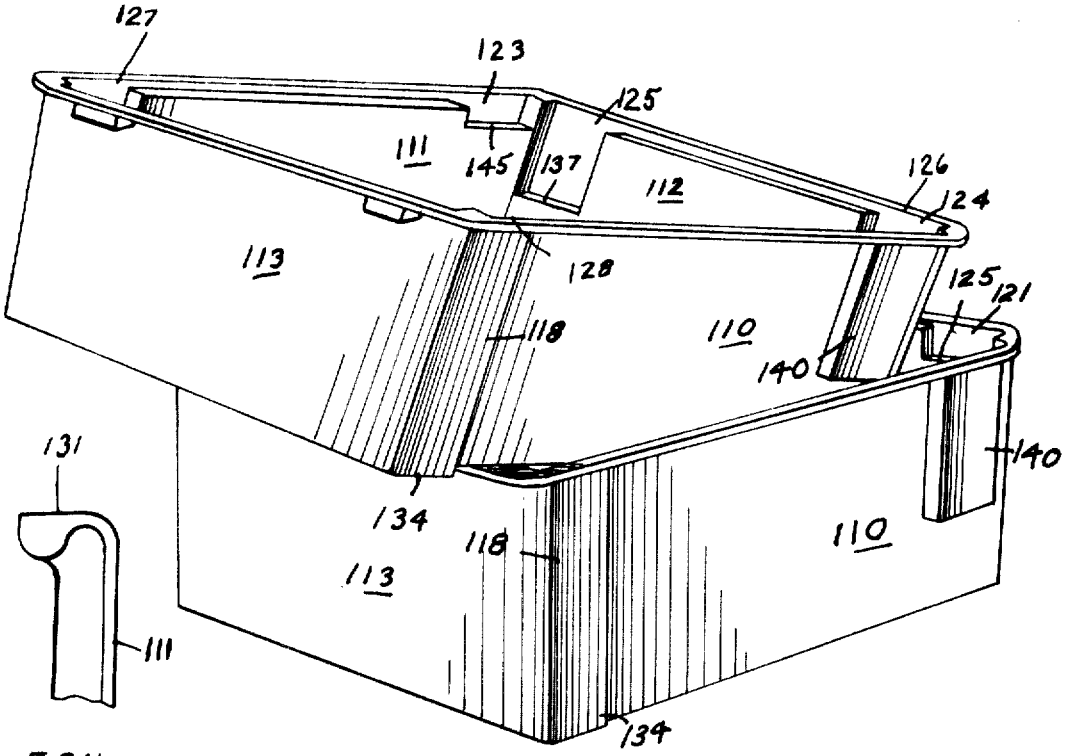
FIG. 11
FIG. 9
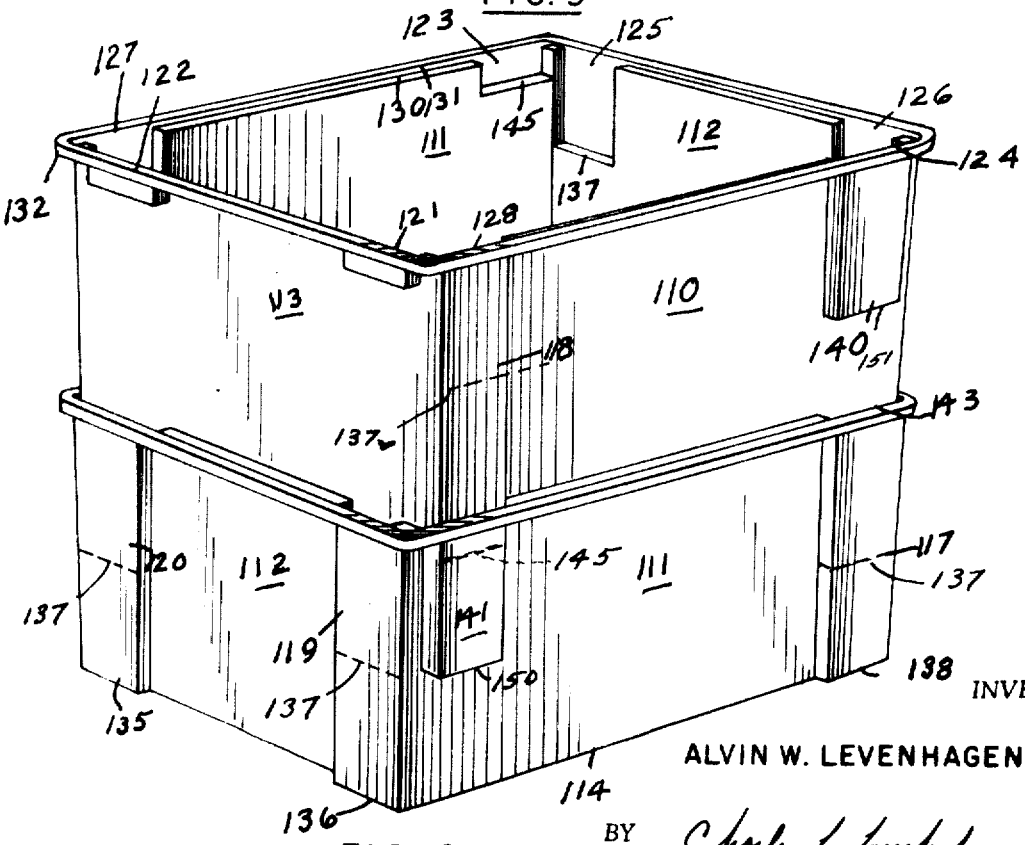
FIG. 10
INVENTOR
ALVIN W. LEVENHAGEN
BY Charles L. Lombard
ATTORNEY

United States Patent Office

Re. 27,649
Reissued May 29, 1973

27,649

NESTING AND STACKING TRAY

Alvin W. Levenhagen, Linesville, Pa., assignor to North American Rockwell Corporation Original No. 3,409,169, dated Nov. 5, 1968, Ser. No. 683,058, Oct. 12, 1967, which is a continuation-in-part of Ser. No. 480,606, Aug. 18, 1965. Application for reissue Nov. 4, 1970, Ser. No. 87,367

Int. Cl. B65d *21/04*

U.S. Cl. 220—97 D 4 Claims

Matter enclosed in heavy brackets [ ] appears in the original patent but forms no part of this reissue specification; matter printed in italics indicates the additions made by reissue.

ABSTRACT OF THE DISCLOSURE

The container is made up of four planar walls made of relatively thin material and has four long legs that are integrally attached to the walls and extend from the top to the very bottom thereof. These long legs have an upwardly facing shoulder about midway between the top and the bottom of the container. Four short legs are attached to the sides of the box, likewise adjacent corners, and these short legs terminate at the bottom in a downwardly facing shoulder approximately midway between top and bottom of the container and an upwardly facing shoulder is formed at the upper end of the leg adjacent the rim of the box; thus, the long leg will rest on the upper end of the short legs during stacking and the long legs will nest in the pockets formed at the upper end of the long legs during nesting.

This application is a continuation-in-part of application Ser. No. 480,606, filed Aug. 18, 1965, now abandoned.

This invention relates to a stackable and nestable container. Containers of the nestable and stackable type are often constructed so that in one position, an upper container will nest within a lower container for storage purposes and when the upper container is rotated one hundred eighty degrees, it will stack vertically on the lower container. Containers of this type have been constructed with both the end walls and side walls made of various designs to permit stacking of identical shaped containers.

Most of these containers are not fully satisfactory. In some such containers, adapters or bumpers have been attached to the end walls of the containers to permit stacking. The addition of the bumpers to the end walls of the containers increases the cost of the containers as well as increasing the number of parts and the manufacturing time. Various other structures of nesting and stacking containers have been devised.

The present invention is directed to a stackable and nestable four walled container in which two of the four walls of the container are disposed at substantially ninety degrees to the other two walls. Pockets are formed at the upper part of one end in two of these sides, and legs are formed in the opposite ends of the pockets in the two sides at the opposite ends from the pockets. Thus, when the containers are stacked, the lower ends of the legs rest in the pockets, and when the containers are nested, the lower ends of the legs are received in the convolution formed by a corresponding leg on a like container.

It is, accordingly, an object of the present invention to provide an improved stackable and nestable container.

Another object of the invention is to provide a stackable and nestable container wherein both side walls and end walls are disposed substantially ninety degrees to the bottom thereof and the side and end walls have improved means to provide nesting and stacking.

Still another object of the invention is to provide a stackable and nestable container which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIGS. 9 and 10 show another embodiment of the invention; and

FIG. 11 is a longitudinal partial sectional view of another embodiment of the invention.

Figure 1:
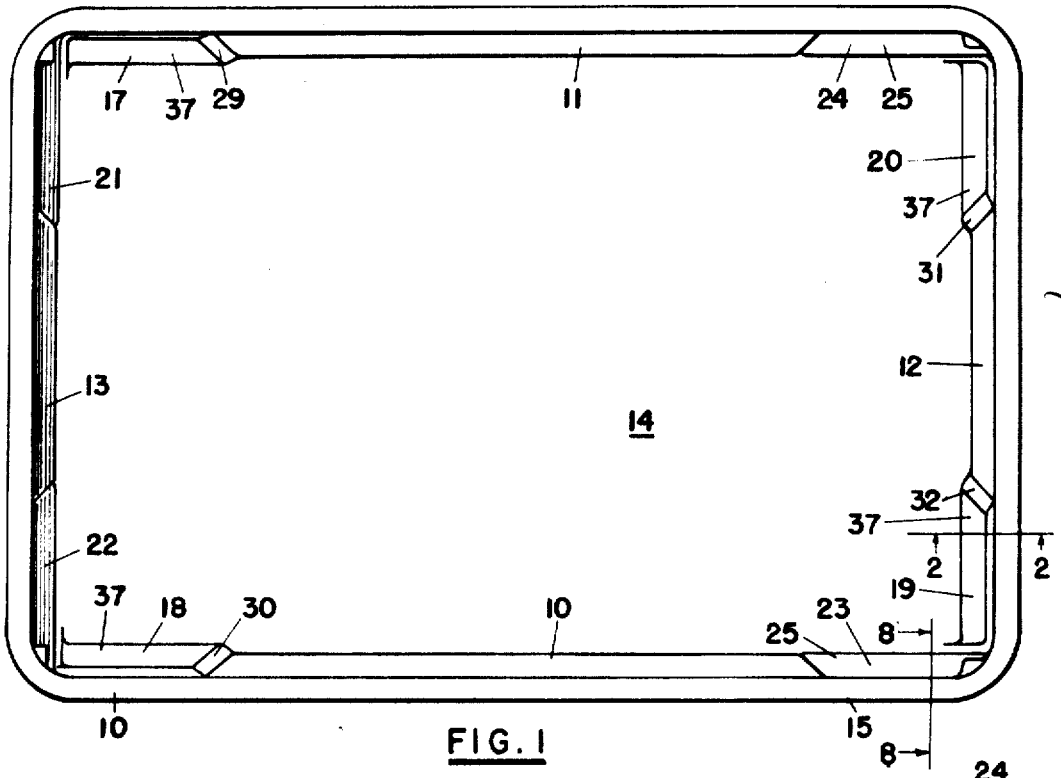
FIG. 1 is a top view of a stackable and nestable container according to the invention.

Now with more specific reference to the drawings, the containers or trays shown each have first and second side walls 10 and 11 and end walls on third and fourth sides 12 and 13 integrally attached and rising up from the bottom 14. The side walls and end walls are disposed at approximately ninety degrees to the bottom; however, they taper upward at approximately two degrees to form a draft in order to enable them to be removed from a mold in accordance with good practice and in order to make readily removable from each other. The walls 10, 11, 12 and 13 may be considered to be the first, second, third and fourth walls, respectively, of the container.

The tray terminates at its upper edge in a rim. The rim extends outwardly at 30, then upwardly and outwardly at 31, and terminates in an enlarged rim portion 32 that has the reinforcing rod insert 26 imbedded therein.

Spaced pockets 21 and 22 are formed in wall 13 and pockets 23 and 24 are formed in walls 10 and 11, respectively. These pockets extend down below the outward portion 30 of the rim and form an upwardly facing seat 25. These seats receive the legs 17, 18 19 and 20 and the lower ends 26 of these legs rest on the seat 25 when the trays are stacked.

Figure 2:
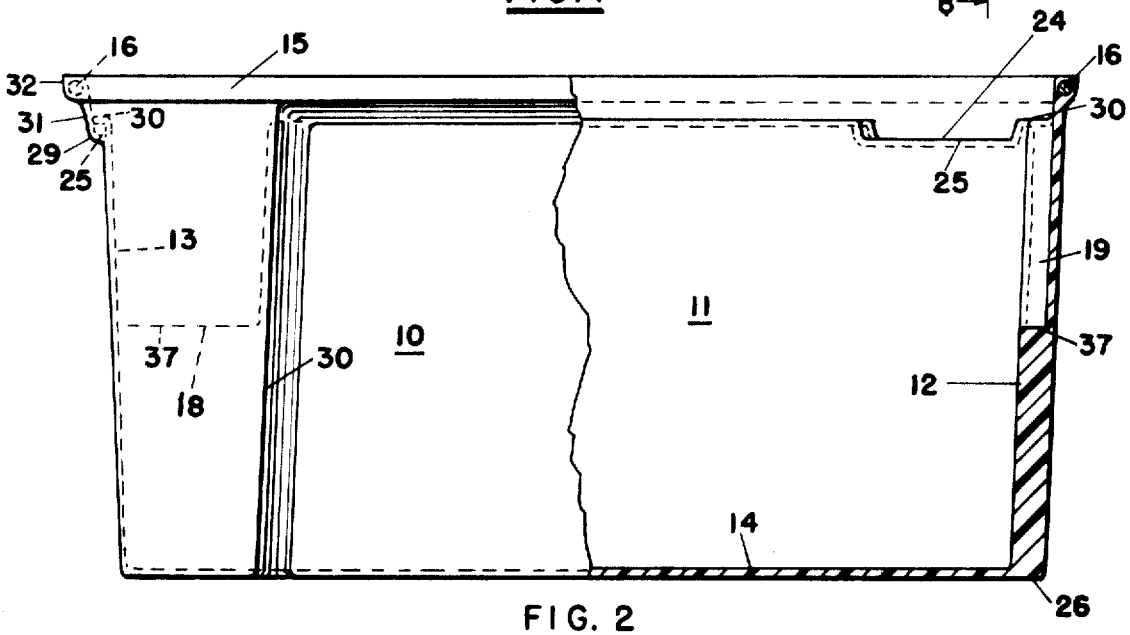
FIG. 2 is a side view partly in cross section showing the container of FIG. 1, the section being taken on line 2—2 of FIG. 1.
Figure 8:
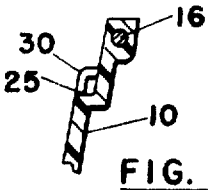
FIG. 8 is a vertical cross sectional view taken on line 8—8 of FIG. 1.
Figure 3:
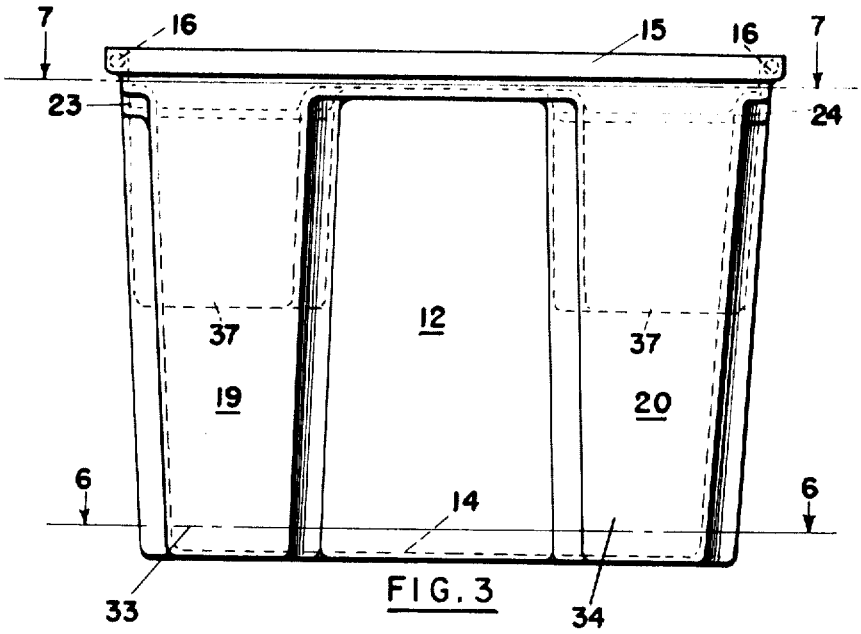
FIG. 3 is an end view of the container.
Figure 4:
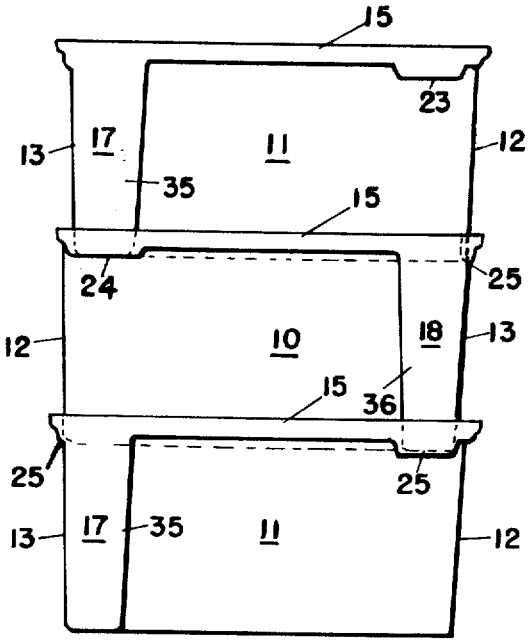
FIG. 4 shows three of the containers stacked one on top of the other.
Figure 5:
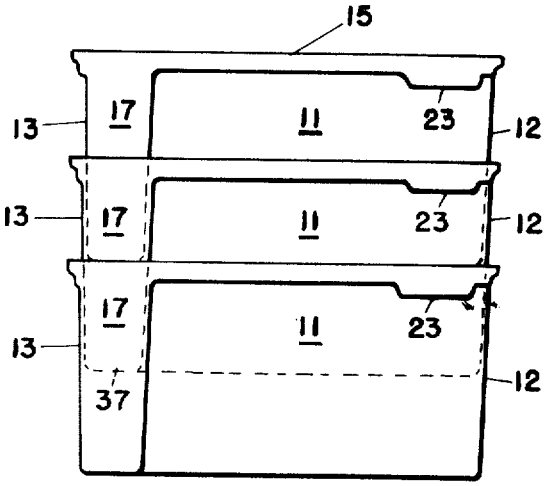
FIG. 5 shows three of the containers nested in each other.
Figure 6:
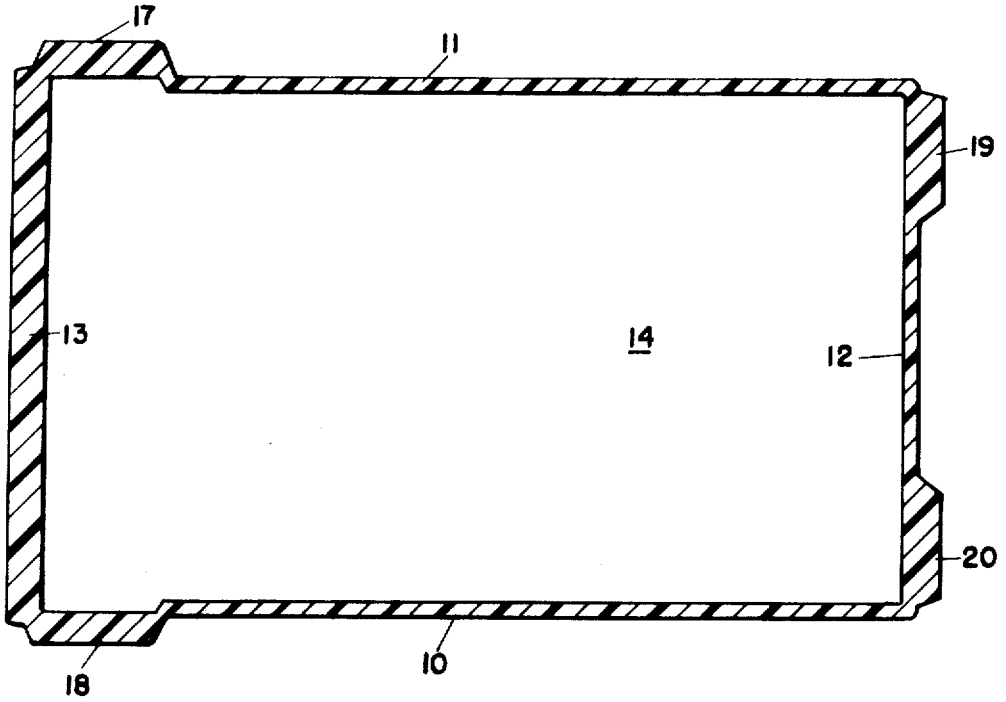
FIG. 6 is a longitudinal cross sectional view taken on line 6—6 of FIG. 3.
Figure 7:
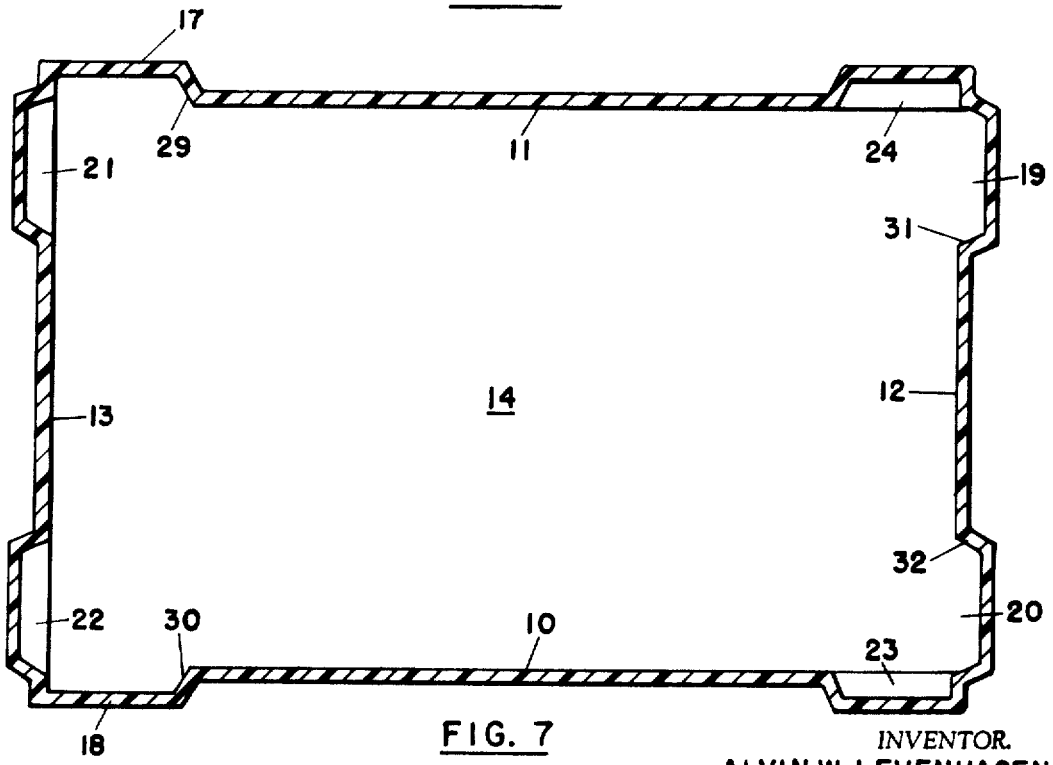
FIG. 7 is a longitudinal cross sectional view taken on line 7—7 of FIG. 3.

Legs 17, 18, 19 and 20 are formed in sides 10 and 11 and end 12, respectively. These legs are formed by providing thickened portions 33, 34, 35 and 36 in the end 12 and the sides 10 and 11, respectively. These thickened portions are recessed providing pockets as shown in FIG. 2 at 19, to receive a corresponding leg of a similar tray when the trays are [stacked] *nested*. The recesses terminate at their bottoms in an upwardly facing shoulder 37 on which the lower end of a leg of a corresponding tray rests when the trays are nested. It will be noted that the material below the recesses is thickened to provide a rigid leg-like support for the trays when the trays are nested.

Thus, it will be seen that the lower ends of the legs rest on the shoulders 25 when the trays are stacked and rest on the shoulders 37 when the trays are nested.

In the embodiment of the invention shown in FIGS. 9 and 10, long notches 125, 126, 127 and 128 are formed in the inside surfaces of sides 112, 111 and 110 respectively. These long notches have a depth approximately equal to the thickness of the long legs 117, 118, 119 and 120; that is, the distance that the long legs extend outward from the outer surfaces of the sides 110, 111 and 112 is approximately equal to the depth that the notches extend outward into the side walls. These long notches terminate in upwardly facing shoulders 137 disposed approximately three-quarters to half way from the upper rim of the container and the bottom.

Short legs 140 and 141 are integrally attached to the outside surface of sides 110 and 111 at the opposite ends thereof from long legs 117 and 118. Short legs 140 and 141 are spaced in from end 112 slightly so that they will nest in notches 123 and 124 when the containers are nested. The lower ends of the short legs may rest on shoulders 145 when the containers are nested. The sole purpose of the legs 140 is to keep the container from becoming jammed should it happen that the containers be mis-stacked, or mis-nested. The short legs do not necessarily rest on the shoulders 145, but they will however fall within pockets 123 when the trays are nested.

Long legs 117, 118, 119 and 120 are received in notches 125, 126, 127 and 128 when the containers are nested and the lower ends of these long legs rest on shoulders 137. The lower ends of short legs 140 and 141 rest on shoulders 145 when the containers are nested. When the containers are stacked, the lower ends of legs 117, 118, 119 and 120 rest on shoulders 145. Short notches 121 and 122 are formed on the inner surface of end 113. These notches have shoulders 146 on which the lower ends 135 and 136 of legs 119 and 120 rest when the containers are stacked.

Bosses 134 and 135 are formed on the outside of side 113 opposite notches 121 and 122. Rim 132 extends entirely around the open top of the containers just outside the surfaces that define the notches. Thus, a slight horizontal ledge 130 and a vertical ledge 131 is formed between the notches by the rim.

In the embodiment of the invention shown in FIG. 11, an alternate design is shown wherein sides similar to sides 110, 111 and 112 and 113 of the previous embodiment extend upwardly to the very top of the container, then outwardly to form an enlarged rim portion 131. That is, the rim portions that would be equivalent to rim portions 130 and 131 in the embodiment shown in FIG. 10 are one and the same.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

[1. A container to be stacked vertically or nested with a container of similar shape and size comprising:

a generally rectangular bottom, a first side wall, a second side wall, a third side wall, and a fourth side wall, said side walls being attached together and to said bottom forming an open topper container, said first side wall and said second side wall having a first long leg integrally attached to its outer surface adjacent one end, and extending from its top edge to its bottom edge, said first long legs terminating at their lower end in a downwardly facing surface flush with the lower surface of said bottom, said first side wall and said second side wall each having a first short leg integrally attached to its outside surface at the end thereof opposite said first long legs and extending from the top edge of said first and said second side wall downward, two second long legs integrally attached to the outside of said third side wall and extending from the upper edge to the lower edge and terminating in a downwardly facing surface flush with the lower surface of said bottom, a first long notch in each of said first side wall and said second side wall on the inside thereof directly inside said first long legs and extending from said top edge to a position approximately halfway to three-quarter way to said bottom and terminating in an upwardly facing shoulder, a first short notch in said first side wall and a first short notch in said second side wall on the inside thereof opposite said first short legs, said first short notches terminating in an upwardly facing shoulder, a second long notch in said third end on the inside thereof extending from the upper edge to a position approximately half way to three-quarter way to said bottom and terminating in an upwardly facing shoulder, two second short notches in said fourth side on the inside surface thereof adjacent the upper edge, said second short notches terminating in an upwardly facing shoulders, when said container is nested with a similar container, said first and said second long notches being adapted to receive first long legs and second long legs of said similar container with the lower ends of said first long legs resting on said shoulders, and said second long notches being adapted to receive second long legs with the lower ends of said long legs resting on said shoulders, and the lower ends of said long legs being adapted to rest on said upwardly facing shoulders in said short notches when said containers are stacked.]

2. The container recited in claim [1] *5* wherein:

said first short legs extend downwardly and terminate [approximately halfway to three-quarter way between the upper edge and the lower edge] *intermediate the top edges and the bottoms* of said first and said second [side] *sides* and terminate in a downwardly facing shoulder, said [shoulder] *shoulders* on said first short legs being adapted to rest on said upwardly facing [shoulder] *second shoulders* in said first short [notch] *notches* when said containers are nested.

3. The tray recited in claim 2 wherein a rim extends completely around said container:

said rim extending outward from said side walls, the inner edge of said rim being flush with the outer surface defining said *short* notches.

4. The container recited in claim [1] *5* wherein:

bosses are formed in the outer surface of said fourth wall directly opposite said second short notches.

*5. A container to be stacked vertically or nested with a container of similar shape and size comprising:*

*a generally rectangular bottom,*

*a first side wall,*

*a second side wall,*

*a third side wall,*

*and a fourth side wall,*

*each one of said side walls being attached to two other of said side walls and to said bottom to form an open topped container,*

*each of said first side wall and said second side wall having a first long leg integrally attached to its outer surface adjacent one end, and extending from its top edge to its bottom edge, said first long legs terminating at their lower end in a downwardly facing surface,*

*each of said first side wall and said second side wall having a first short leg integrally attached to its outside surface at the end thereof opposite said first long*

*leg and extending from the top edge of each of said first and said second side walls downward,*

*two second long legs integrally attached to the outside of said third side wall and extending from the upper edge to the lower edge and terminating in a downwardly facing surface,*

*a first long notch in each of said first side wall and said second side wall on the inside thereof directly inside said first long legs, said first long notches each being partially defined by one of upwardly facing first shoulders located intermediate said top edge and said bottom,*

*a first short notch in each of said first side wall and said second side wall on the inside thereof opposite each of said first short legs, each of said first short notches terminating in one of upwardly facing second shoulders,*

*two second long notches in said third side wall on the inside thereof directly inside said second long legs, said second long notches each being partially defined by one of upwardly facing third shoulders located intermediate said top edge and said bottom,*

*two second short notches in said fourth side on the inside surface thereof adjacent the upper edge, each of said second short notches terminating in one of upwardly facing fourth shoulders,*

*said second and fourth shoulders being located closer*

*to said top edge than said first and said third shoulders, such that when said container is nested with a similar container, said first and said second long notches receive first long legs and second long legs of said similar container with the lower ends of said first long legs resting on said first shoulders, and said second long notches being adapted to receive said second long legs with the lower ends of said second long legs resting on said third shoulders, and the lower ends of said first and second long legs being adapted to rest on said second and fourth shoulders in said first and second short notches when said containers are stacked.*

References Cited

The following references, cited by the Examiner, are of record in the patented file of this patent or the original patent.

UNITED STATES PATENTS

| | | | |
|---|---|---|---|
| 2,823,829 | 2/1958 | Frater | 220—97 |
| 3,052,373 | 9/1962 | Frater | 220—97 |

FOREIGN PATENTS

| | | | |
|---|---|---|---|
| 167,115 | 5/1959 | Sweden | 220—97 |

GEORGE E. LOWRANCE, Primary Examiner